United States Patent
Guhe

(10) Patent No.: US 10,670,133 B2
(45) Date of Patent: Jun. 2, 2020

(54) METAL SLEEVE AND METHOD FOR PRODUCING IT

(71) Applicant: Metaldyne GmbH, Zell am Harmersbach (DE)

(72) Inventor: Christoph Guhe, Ettenheim (DE)

(73) Assignee: Metaldyne Zell GmbH & Co. KG, Zell am Harmersbach (DE)

( * ) Notice: Subject to any disclaimer, the term of this patent is extended or adjusted under 35 U.S.C. 154(b) by 193 days.

(21) Appl. No.: 15/034,261

(22) PCT Filed: Nov. 3, 2014

(86) PCT No.: PCT/EP2014/073556
§ 371 (c)(1),
(2) Date: May 4, 2016

(87) PCT Pub. No.: WO2015/063293
PCT Pub. Date: May 7, 2015

(65) Prior Publication Data
US 2016/0265645 A1    Sep. 15, 2016

(30) Foreign Application Priority Data

Nov. 4, 2013 (DE) .................. 10 2013 112 123

(51) Int. Cl.
*B21K 21/12* (2006.01)
*B21K 21/08* (2006.01)
(Continued)

(52) U.S. Cl.
CPC ............ *F16H 57/021* (2013.01); *B21C 23/00* (2013.01); *B21K 21/08* (2013.01); *B21K 21/12* (2013.01);
(Continued)

(58) Field of Classification Search
CPC ... B21C 23/00; B21C 23/085; B21C 23/0183; B21C 23/18; B21D 17/02; B21K 21/08;
(Continued)

(56) References Cited

U.S. PATENT DOCUMENTS

| | | |
|---|---|---|
| 4,768,268 A | 9/1988 | Ishihara et al. |
| 4,982,592 A | 1/1991 | Simon |

(Continued)

FOREIGN PATENT DOCUMENTS

| | | |
|---|---|---|
| DE | 3543128 A1 | 6/1986 |
| DE | 3705426 A1 | 8/1987 |

(Continued)

*Primary Examiner* — Christopher J Besler
(74) *Attorney, Agent, or Firm* — The Webb Law Firm

(57) ABSTRACT

A method for producing a metal sleeve includes providing a first metal sleeve semi-finished product having a metal body. The metal body surrounds an inner channel. At least one groove is located in the metal body on the side of the inner channel. The first metal sleeve semi-finished product is pressed into a first die by means of a punch and in the process is formed by impact extrusion into the metal sleeve to be produced. The first die is designed such that a proximal front edge, which is spaced apart from the distal front edge and delimits the groove in the proximal direction, is formed in the metal body on the side of the inner channel. A metal sleeve includes a metal body which surrounds an inner channel running between a proximal and a distal opening. The inner channel has at least one groove set back into the metal body, running in the longitudinal direction of the inner channel and stepped on both sides by a distal and a proximal front edge. The proximal front edge of the groove is produced by impact extrusion. A method for producing a gearbox is provided.

18 Claims, 10 Drawing Sheets

(51) Int. Cl.
*B21K 21/16* (2006.01)
*B21C 23/00* (2006.01)
*B21J 5/12* (2006.01)
*B21K 1/06* (2006.01)
*B21C 23/18* (2006.01)
*F16H 57/021* (2012.01)

(52) U.S. Cl.
CPC ............ *B21K 21/16* (2013.01); *B21C 23/183* (2013.01); *B21J 5/12* (2013.01); *B21K 1/063* (2013.01)

(58) Field of Classification Search
CPC ........ B21K 21/12; B21K 21/16; B21K 1/063; B21J 5/12
See application file for complete search history.

(56) References Cited

U.S. PATENT DOCUMENTS

| | | | |
|---|---|---|---|
| 5,070,743 | A | 12/1991 | Simon |
| 6,470,726 | B1 | 10/2002 | Murata et al. |
| 7,334,337 | B2 * | 2/2008 | Matsuura ............ F16C 33/1065 29/898 |
| 2007/0137277 | A1 | 6/2007 | Tye et al. |

FOREIGN PATENT DOCUMENTS

| | | |
|---|---|---|
| DE | 60020508 T2 | 5/2006 |
| EP | 0352518 A2 | 1/1990 |
| EP | 0721816 A1 | 7/1996 |
| GB | 2121326 A | 12/1983 |
| GB | 2400892 A | 10/2004 |
| JP | 2006316829 A | 11/2006 |

* cited by examiner

METAL SLEEVE AND METHOD FOR PRODUCING IT

CROSS-REFERENCE TO RELATED APPLICATIONS

This application is the United States national phase of International Application No. PCT/EP2014/073556 filed Nov. 3, 2014, and claims priority to German Patent Application No. 10 2013 112 123.3 filed Nov. 4, 2013, the disclosures of which are hereby incorporated in their entirety by reference.

BACKGROUND OF THE INVENTION

Field of the Invention

The invention relates to a metal sleeve having a metal body which surrounds an inner channel running between a proximal and a distal opening, wherein the inner channel comprises at least one groove set back into the metal body, running in the longitudinal direction of the inner channel and stepped on both sides by a distal and a proximal front edge.

Description of Related Art

Metal sleeves are required in large quantities as parts for more complex components and machines in the prior art and are therefore mass-produced by the metalworking industry. For example, metal sleeves like the previously described metal sleeve having at least one groove set back into the inner channel and stepped on both sides are required in the production of gearboxes for motor vehicles.

Since metal sleeves are mass-produced products, during manufacture, in addition to production precision and dimensional accuracy, it is essential that the production method is economical with short process times, so that the metal sleeves can be produced in large numbers as cheaply as possible.

Whilst purely cylindrical metal sleeves can be produced very easily and quickly, for example by die forging or backward impact extruding a metal body, this is not easily achievable in the case of the previously described metal sleeve as a result of the indentation due to the at least one groove in the inner channel of the metal sleeve.

In the prior art, such metal sleeves are therefore produced by radial forging in multi-step processes, in which grooves are inserted into the inner channel by radially cold forming the metal body on the outside by means of moving forging hammers. Although the metal sleeves can be produced with high precision in this way, radial forging is time-consuming and requires a relatively long production time per metal sleeve. For a specific production volume, it is therefore often necessary to operate a plurality of production lines in parallel, which also still have to be equipped with expensive special tools for the radial forging process. Therefore, producing the metal sleeves by means of radial forging involves high investment costs.

SUMMARY OF THE INVENTION

Taking this prior art as the starting point, an object of the invention is providing a method for producing a metal sleeve which can be carried out with lower investment costs, and by means of which shorter production times can be obtained, as well as providing a correspondingly cheap and rapidly producible metal sleeve.

This object is at least partly achieved according to the invention by a method for producing a metal sleeve, in which a first metal sleeve semi-finished product comprising a metal body is provided, wherein the metal body surrounds an inner channel running between a proximal and a distal opening, and wherein at least one groove, which is stepped on one side, is located in the metal body on the side of the inner channel, this groove running continuously from a distal front edge to the proximal opening, and in which the first metal sleeve semi-finished product is pressed into a first die by means of a punch and in the process is formed by impact extrusion into the metal sleeve to be produced, wherein the first die is designed such that a proximal front edge, which is spaced apart from the distal front edge and delimits the groove in the proximal direction, is formed in the metal body on the side of the inner channel.

In addition, the previously mentioned object is at least partly achieved by a metal sleeve, in particular produced according to the previously described method, having a metal body which surrounds an inner channel running between a proximal and a distal opening, wherein the inner channel comprises at least one groove set back into the metal body, running in the longitudinal direction of the inner channel and stepped on both sides by a distal and a proximal front edge, and wherein the proximal front edge of the groove is produced by impact extrusion.

Within the framework of the present invention, it was recognised that the disadvantages of the methods from the prior art, in which a groove stepped on both sides is produced in the inner channel of a metal sleeve by radial forging, can be avoided by producing this groove—at least its proximal front edge—by impact extrusion. In this way, considerably shorter production times can be achieved.

For example, using the previously described method, production times per metal sleeve could be achieved which were at about one fifth or even sometimes at a tenth of the typical production times of radially forged metal sleeves. Therefore, compared to radial forging, a specified production volume can be achieved with a lower number of production lines using the previously described method. Furthermore, impact extrusion tools involve lower investment costs than the special tools required for radial forging, so that through this further costs can be saved. As a result, the previously described metal sleeves can thereby be produced more economically and at lower cost.

For the method, firstly a first metal sleeve semi-finished product comprising a metal body is provided, wherein the metal body surrounds an inner channel running between a proximal and a distal opening.

The proximal and distal openings are understood as the openings of a sleeve-shaped metal sleeve semi-finished product which are opposite one another, wherein the proximal opening basically constitutes that opening, by means of which the metal sleeve semi-finished product in question is first inserted into the first die, and the distal opening correspondingly constitutes the opening opposite the proximal opening.

At least one groove, which is stepped on one side, is located in the metal body of the first metal sleeve semi-finished product on the side of the inner channel, this groove running continuously from a distal front edge to the proximal opening. In the present case, a distal front edge means that that front edge delimits the groove in the direction of the distal opening. The distal front edge is consequently spaced apart from the distal opening. The groove running continuously to the proximal opening means that the groove does not have a proximal front edge, but reaches to the end of the metal body on the side of the proximal opening.

The groove preferably runs in the axial direction of the metal sleeve semi-finished product. In the present case, the axial direction means a direction parallel to the axial axis of the metal sleeve semi-finished product or metal sleeve, respectively, wherein the axial axis in particular runs centrally through the proximal and through the distal opening of the metal sleeve semi-finished product or metal sleeve, respectively. A radial axis means an axis intersecting the axial axis at right angles.

The first metal sleeve semi-finished product is preferably formed essentially rotationally symmetrically, having a circular cross section, the size of which, however, can alter in the axial direction.

The first metal sleeve semi-finished product is pressed into a first die by means of a punch and in the process is formed by impact extrusion into the metal sleeve to be produced. The forming by means of impact extrusion preferably takes place as cold forming Impact extrusion according to DIN 8583 is a pressure forming process, in which the material to be formed, that is to say, in the present case the metal body of the first metal sleeve semi-finished product, under the effect of high pressure is caused to flow by a punch pressing the metal body into a shaping die which is reduced in its cross-sectional area. For this purpose, in particular the inner contour of the die can have a cross-sectional tapering and/or a mandrel arranged in the die, a cross-sectional enlargement or one or more bulges.

The first die is designed such that a proximal front edge which is spaced apart from the distal front edge and delimits the groove in the proximal direction, is formed in the metal body on the side of the inner channel. The proximal front edge means that that front edge delimits the groove in the direction of the proximal opening. The proximal and the distal front edges therefore lie opposite one another and together delimit the groove in both directions, i.e. in the direction of the proximal opening and in the direction of the distal opening.

The proximal front edge is produced with the method by impact extrusion in an area in which in the case of the first metal sleeve semi-finished product previously a part of the groove stepped on one side was still located. By means of impact extrusion in the correspondingly formed first die the material of the metal sleeve is able to flow into this area of the groove of the first metal sleeve semi-finished product and thereby form the proximal front edge.

In the following, the term "groove contour" means the course of the edge of the groove in relation to the rest of the inner channel area. Since in the case of the metal sleeve the groove is stepped on both sides, the metal sleeve has a closed groove contour, i.e. a groove contour fully delimiting the groove. The area delimited by the groove contour, i.e. the area of the groove on the surface of the inner channel, is referred to as the "groove area" in the following. Since the inner channel is curved in the azimuthal direction, i.e. in a peripheral direction about the axial axis, due to the sleeve shape of the metal sleeve, the groove contour and the groove area also have a corresponding curvature. In order to characterise the groove contour and the groove area more easily, an equal-area projection of these onto a plane surface can be effected, by cutting open a geometrically-true cylindrical representation of the inner area of the metal sleeve at one point in the axial direction and then bending it in one plane.

A plurality of embodiments of the method and of the metal sleeve are described below. The embodiments described in relation to the metal sleeve can also be correspondingly transferred to the method for producing such a metal sleeve and vice versa. In particular, the method can in each case be adapted such that by using such a method a corresponding metal sleeve is produced according to one of the following embodiments; on the other hand, the metal sleeves can have features which are produced in the metal sleeve by the described embodiments of the method.

According to the first embodiment of the method, the first die has an inner contour, which extends in the axial direction from the die opening for inserting the first metal sleeve semi-finished product and has a cross-sectional tapering which is spaced apart from the die opening, and the first metal sleeve semi-finished product is pressed into the first die by means of the punch to the extent that the proximal opening lies behind and the distal front edge lies in front of the cross-sectional tapering.

By means of the cross-sectional tapering spaced apart from the die opening, the material of the metal sleeve can be caused to flow at this place and as a results forms a proximal front edge delimiting the groove in the proximal direction. By pressing the first metal sleeve semi-finished product into the first die by means of the punch to the extent that the proximal opening lies behind and the distal front edge lies in front of the cross-sectional tapering, the proximal opening is moved past the cross-sectional tapering through the inner contour of the die, while the distal front edge is only moved up to a distance before the cross-sectional tapering into the contour. In this way, the proximal front edge can be inserted into the groove at a place spaced apart from the distal front edge, so that the groove of the first metal sleeve semi-finished product is not fully closed, but remains a groove stepped on both sides by the proximal and distal front edges in the metal body.

According to a further embodiment of the method, the inner contour of the first die in the area of the cross-sectional tapering has a first area with a first cross section which is constant in the axial direction, a transition area adjoining the first area on the side facing away from the die opening and with a cross section decreasing in the axial direction from the first to a second smaller cross section and a second area adjoining the transition area on the side facing away from the die opening and with a second cross section which is constant in the axial direction, wherein the inner contour in the transition area has a maximum angle in the range from 25° to 55°, preferably 30° to 50°, in particular 35° to 45°, to the axial axis of the inner channel. It has become apparent that the proximal front edge can be precisely and reliably produced with such a first die. Preferably, the angle of the inner contour to the axial axis of the inner channel is essentially constant in the entire transition area. The first die then has an essentially tapered shape in the transition area.

The first and second areas and the transition area preferably have an essentially circular shape, wherein the diameter of this circular cross section in the second area is smaller than in the first area and in the transition area tapers continuously from the diameter in the first area to the diameter in the second area. The cross-sectional profile in the transition area, that is to say, the profile of the transition area in the axial direction, is preferably continuous, in particular smooth (i.e. continuously differentiable). In this way, optimum material flow is ensured during the impact extrusion process.

The angle of the inner contour to the axial axis at one point of the inner contour means the angle between the tangent of the inner contour profile at this point and the axial axis. If, for example, the transition area has a conical profile with a constant cross-sectional tapering, then the angle of the inner contour to the axial axis is also constant over the entire transition area. If, for example, the transition area has a smooth profile, then the angle of the inner contour to the axial axis at the beginning and at the end of the transition area is 0° in each case, since the profile at these points smoothly adjoins the first and second areas, and increases in each case from both sides towards the middle of the transition area to reach its maximum value in the inflection point of the profile. Tests have shown that the best results for forming a uniform and precise proximal front edge were obtained with a maximum angle in the range from 25° to 55°, preferably from 30° to 50°, in particular from 35° to 45°.

According to a further embodiment of the method, the maximum angle of the inner contour in the transition area to the axial axis of the inner channel is chosen such that the ratio of this angle to the maximum angle of the proximal front edge to the axial axis of the inner channel is greater than 1, preferably greater than 1.1, in particular greater than 1.2. The maximum angle of the proximal front edge to the axial axis of the inner channel in the present case means the maximum angle which the contour of the proximal front edge has in longitudinal section centrally through the groove to the axial axis of the inner channel of the metal sleeve. If the contour of the proximal front edge can be represented, for example, by an at least twice continuously differentiable function, then the maximum angle results at the location of an inflection point of this function. If the contour of the proximal front edge has an essentially straight course, then the proximal front edge has essentially at every point the same (maximum) angle to the axial axis of the inner channel.

Tests have shown that a certain maximum angle of the proximal front edge to the axial axis of the inner channel can be set during production of the metal sleeve by using a die for forming the first metal sleeve semi-finished product, the contour of which in the transition area has a correspondingly greater maximum angle to the axial axis of the inner channel compared to the desired angle of the proximal front edge. If, for example, a maximum angle of the proximal front edge of 35° is to be set, then the maximum angle of the die contour in the transition area is preferably more than 35°, in particular at least 38.5°.

According to a corresponding embodiment of the metal sleeve, the outer contour of the metal sleeve has such a maximum angle to the axial axis of the inner channel in the area of the proximal front edge such that the ratio of this angle to the maximum angle of the proximal front edge to the axial axis of the inner channel is greater than 1, preferably greater than 1.1, in particular greater than 1.2.

According to a further embodiment of the method, the degree of deformation on the cross-sectional tapering for producing the proximal front edge is in the range between 30 and 45%, preferably between 35 and 40%. The degree of deformation at the cross-sectional tapering means the relative cross-sectional reduction which the metal sleeve undergoes at the cross-sectional tapering. The degree of deformation U at the cross-sectional tapering results from the formula $U=1-Q_2/Q_1$, where $Q_1$ is the cross-sectional area of the die directly in front of the cross-sectional tapering and $Q_2$ is the cross-sectional area of the die directly behind the cross-sectional tapering. $Q_1$ and $Q_2$ result from the respective cross-sectional areas of the die directly before and after the cross-sectional tapering minus the respective cross-sectional surfaces of an inner mandrel arranged in the die at the respective spot.

According to a further embodiment of the method, a mandrel having a cylindrical outer contour is arranged in the first die, the cross section of which is adapted to the inner diameter of the metal sleeve to be produced.

In this way, the dimensional accuracy of the inner diameter of the metal sleeve to be produced can be ensured, since during the impact extrusion process in the first die no material can flow into the inner channel. In addition, in this way, the proximal front edge can also be formed more precisely, since the material of the metal body can be conducted in a targeted manner essentially in the axial direction during the impact extrusion process. The mandrel in the first die in particular has no elements extending into the groove, so that it can be easily withdrawn from the produced metal sleeve after impact extrusion has been carried out in the first die.

According to a further embodiment of the method, the first metal sleeve semi-finished product is provided by providing a second metal sleeve semi-finished product with a metal body, wherein the metal body surrounds an inner channel running between a proximal and a distal opening, and wherein the second metal sleeve semi-finished product is pressed into a second die by means of a punch and in the process is formed by impact extrusion into the first metal sleeve semi-finished product, wherein a mandrel is arranged and designed in such a way in the second die that a groove, which is stepped on one side, is formed in the metal body on the side of the inner channel and runs continuously from a distal front edge to the proximal opening.

In this way, the first metal sleeve semi-finished product required for producing the metal sleeve can also be provided by impact extrusion and hence in a very economical way with short production times. When the second metal sleeve semi-finished product is pressed into the second die, the metal body surrounding the inner channel is pulled over the mandrel arranged in the second die, wherein the mandrel forms the metal body beginning from the proximal opening by impact extrusion with formation of a groove running in the axial direction. The position of the distal front edge is determined by how far the second metal sleeve semi-finished product is pressed into the second die and hence over the mandrel.

According to a further embodiment of the method, the mandrel in the second die has at least one lateral bulge running in the longitudinal direction of the mandrel for forming the at least one groove which is stepped on one side. This bulge leads to a cross-sectional tapering in the second die, so that impact extrusion of the second metal sleeve semi-finished product occurs with formation of the groove stepped on one side in the inner channel Apart from the at least one bulge, the mandrel preferably has a cylindrical cross section which is adapted to the diameter of the second metal sleeve semi-finished product.

According to a further embodiment of the method, the second die has an inner contour which extends in the axial direction from the die opening for inserting the second metal sleeve semi-finished product and has a cross-sectional tapering which is spaced apart from the die opening. The material of the metal body is caused to flow by this cross-sectional tapering of the inner contour, so that the impact extrusion process is supported in the second die. The cross-sectional tapering is preferably arranged in the area of the bulge of the mandrel. In this way, the flowing of the material of the metal body is supported right at the place where the bulge is located, so that forming the groove stepped on one side into the inner channel is made easier and through the cross-sectional tapering the material required for this is also provided.

According to a further embodiment of the method, the mandrel is arranged and formed in the second die in such a way that a plurality of, in particular four, grooves stepped on one side and distributed over the periphery of the inner channel are inserted into the inner channel of the second metal sleeve semi-finished product, these grooves in each case running continuously from a distal front edge to the proximal opening. In this way, using the mandrel during the impact extrusion process in the second die a plurality of grooves can be produced at the same time and hence as a result after the impact extrusion process in the first die a plurality of grooves stepped on both sides in each case by a distal and proximal front edge can be produced. For example, the mandrel can have four similar bulges which are distributed at intervals of 90° respectively in the peripheral direction of the mandrel, so that four grooves stepped on one side and distributed around the periphery of the inner channel at respective intervals of 90° are correspondingly formed in the metal body of the first metal sleeve semi-finished product.

According to a further embodiment of the method, the second metal sleeve semi-finished product is provided by firstly producing a cup-shaped metal body from a solid metal body by means of cup backward impact extrusion and then producing the second metal sleeve semi-finished product by removing the bottom from the cup-shaped metal body. In this way, the second metal sleeve semi-finished product can also be produced by impact extrusion and can hence be produced in a very economical way with a short process time. The solid metal body is preferably an essentially cylindrical solid body which can have a central indentation on one or both front sides for better positioning during the cup backward impact extrusion process.

Cup backward impact extrusion means pressing the solid metal body into a cup backward impact extrusion die by means of a punch, wherein the metal of the solid metal body flowing during the impact extrusion process flows laterally past the punch in the opposite direction to it and in this way forms the edge of the cup-shaped metal body. The bottom remaining in the cup-shaped metal body can then be subsequently removed, for example by punching or sawing it out or removing it in another way, to provide the second metal sleeve semi-finished product.

Alternatively, the second metal sleeve semi-finished product can be provided by cutting off a tube section of suitable length from a prefabricated tube. In addition, the second metal sleeve semi-finished product can also be provided by providing a preferably cylindrical solid body of a suitable size, for example a sawn section from a solid profile, and boring it out to form an inner channel.

According to a further embodiment of the method, the metal sleeve is pressed into a third die by means of a punch and in the process is formed by impact extrusion, wherein the third die has an inner contour, which extends from the die opening for inserting the metal sleeve and has a cross-sectional tapering which is spaced apart from the die opening, and the metal sleeve is pressed into the third die by means of the punch to the extent that the proximal opening lies behind and the proximal front edge lies in front of the cross-sectional tapering.

The impact extrusion of the metal sleeve induced by the cross-sectional tapering is thereby limited to an area between the groove and the proximal opening, so that the inner contour and possibly also the outer contour of the metal body can be adapted in the area of the proximal opening by the third die without in doing so adversely affecting the previously produced groove. In particular, a correspondingly formed mandrel, in particular a cylindrical mandrel, the cross section of which is adapted to the cross section to be set in the area of the proximal opening, can be arranged in the third die for this purpose.

According to one exemplary embodiment of the metal sleeve, the at least one groove has a groove contour with two essentially parallel axial areas, in which the groove contour runs essentially parallel to the axial direction of the metal sleeve, and with a proximal and a distal front edge area, in which the groove is delimited in the proximal and distal directions, respectively. In the proximal and distal front edge areas the groove contour in each case no longer runs parallel to the axial direction but at least partly transverse to it. In particular, in the proximal and distal front edge areas the tangents of the groove contour have an angle of at least 1° to the axial direction of the metal sleeve. Here, this angle in each case means the angle between the tangent at a point on the groove contour to the parallel of the axial axis through this point. The groove area delimited by the groove contour correspondingly also has a proximal and a distal front edge area, in which the groove area is delimited by the proximal and distal front edge areas of the groove contour respectively in the peripheral direction of the inner channel. The area of the groove area delimited by the axial areas of the groove contour in the peripheral direction is correspondingly referred to as the axial area of the groove area.

According to a further embodiment of the metal sleeve, the metal body at least in the area of the proximal front edge has a fibre orientation which is characteristic for impact extrusion. In the present case, the fibre orientation of the metal body means the alignment of the individual microstructure grains. The fibre orientation can, for example, be made visible with a cut through the metal body by firstly polishing and then etching the cut face.

Impact extruded metal bodies have a characteristic fibre orientation which in particular differs from the fibre orientation of radially forged metal bodies. Therefore, by examining the fibre orientation of a metal sleeve it can be determined whether the proximal front edge has been produced by radial forging or (according to the invention) by impact extrusion.

With production of the proximal front edge by radial forging, the forces acting on the metal body due to the radial movement of the forging hammers result in a radial deformation of the material by compression and hence in a deformation of the fibres by compression. Therefore, after radial forging has taken place, the metal body has a fibre orientation in the area of the proximal front edge which is deformed by compression and distorted, typically with a large number of interruptions and displacements of the individual fibres. The fibre orientation in the area of the proximal front edge therefore differs greatly from the fibre structure of the metal body in the areas abutting on this area of the proximal front edge.

In contrast, the production of the proximal front edge by impact extrusion results in a uniform fibre orientation in the area of the proximal front edge, in which the individual fibres follow the contour of the metal body essentially without significant deformation by compression, distortions or interruptions, so that in the area of the proximal front edge a fibre structure results which is typically comparable with the fibre structure of the metal body in the areas abutting on this area of the proximal front edge.

According to a further embodiment of the metal sleeve, the width of the groove area decreases steadily in the proximal direction in the area of the proximal front edge to a width of less than 25%, preferably of less than 10%, of the maximum width of the groove area. In the present case, the width of the groove area means the width of the groove area in the peripheral direction of the inner channel, i.e. transverse to the axial direction of the metal sleeve. With axial forging known from the prior art, due to the external force effect of the forging hammer used a relatively straight edge is created in the area of the proximal front edge, so that the width of the front edge and hence the width of the groove area in the area of this edge decreases abruptly from a relatively large width to zero. In contrast, impact extrusion results in a rounder shape of the proximal front edge, so that the width of the groove area in the direction of the proximal front edge decreases steadily to a width of less than 25%, preferably of less than 10%. In this way, metal sleeves with a proximal front edge produced by impact extrusion can be easily distinguished from metal sleeves with a proximal front edge produced by radial forging.

According to a further embodiment of the metal sleeve, the groove area in the proximal front edge area is less than 85%, preferably less than 80%, of the area of the smallest rectangle embedding the groove area in the proximal front edge area. The smallest rectangle which embeds the groove area in the proximal front edge area means the smallest rectangle which borders the groove area from the transition of the axial area to the proximal front edge area of the groove area up to the proximal end of the groove area. Due to the curvature of the inner channel area, this rectangle is a curved rectangle corresponding to the inner channel. In order to determine the smallest rectangle easily, preferably firstly an equal-area projection of the groove area into a plane is effected, since in this way the smallest rectangle also lies in this plane and is consequently uncurved. The proportion of area of the groove area on the area of the rectangle can also be determined on the basis of the equal-area projection in the plane.

By means of the proportion of the groove area on the area of the smallest embedding rectangle, the rounder shape of the proximal front edge which is characteristic for impact extrusion can be easily distinguished from the shape formed during radial forging, since the groove area due to the more pronounced rounding of the groove contour in the proximal front edge area occupies a smaller area of the rectangle embedding the groove area in this area than the groove area formed during radial forging.

According to a further embodiment, the outer contour of the metal sleeve in the area of the proximal front edge has a maximum angle to the axial axis of the inner channel of at most 75°, preferably of at most 60°, in particular of at most 45°. The outer contour of the metal sleeve in the area of the proximal front edge means the contour of the outside of the metal body in the area in which the proximal front edge is located at the corresponding place in the inner channel. With conventional production of the proximal front edge by radial forging, the movements of the forging hammers which are directed radially inwards result in the formation of a rather sharp edge at the transition of the proximal front edge to the rest of the groove, so that the outer contour at his place occupies very large angles of up to 90°. In contrast, with impact extrusion an outer contour of the metal sleeve can be produced which does not have any such sharp edges, so that in particular a maximum angle of the outer contour to the axial axis of the inner channel in this area of at most 75°, of at most 60° or even of at most 45° can be obtained.

According to a further embodiment of the metal sleeve, the metal sleeve consists of a steel alloy, preferably having a carbon content of at most 0.5% wt. Higher carbon contents have proved problematical with impact extrusion. Basic or quenched and tempered steels can be used for the metal sleeve, for example.

According to a further embodiment of the metal sleeve, the inner channel, with the exception of the at least one groove (or with the exception of a plurality of grooves, respectively) has a rotationally symmetrical cross section. It has been established that with the described impact extrusion process for producing the proximal front edge at the same time a high degree of dimensional accuracy can be obtained in the metal sleeve, so that by with this method in particular a rotationally symmetrical cross section of the inner channel can be provided. Such metal sleeve are frequently in demand in practice.

According to a further embodiment of the metal sleeve, the inner channel comprises a plurality of, in particular four, grooves, which are distributed over the periphery of the inner channel, are set back into the metal body, run in the longitudinal direction of the inner channel and are stepped on both sides by a distal and a proximal front edge.

In the production of gearboxes, in particular motor vehicle gearboxes, metal sleeves with certain geometric specifications, in particular with at least one groove which is stepped on both sides and set back into the inner channel, are frequently in demand, which can be met by the metal sleeves corresponding to the previously described exemplary embodiments. Since the above described metal sleeve can be manufactured particularly cheaply and with short production times, this metal sleeve is particularly suitable for cost-sensitive products, such as gearboxes, in particular in automotive engineering.

BRIEF DESCRIPTION OF THE DRAWINGS

Further features and advantages of the present invention are described below by means of exemplary embodiments of the metal sleeve and of the method for producing it, wherein reference is made to the accompanying figures.

DETAILED DESCRIPTION OF THE INVENTION

Figure 1:
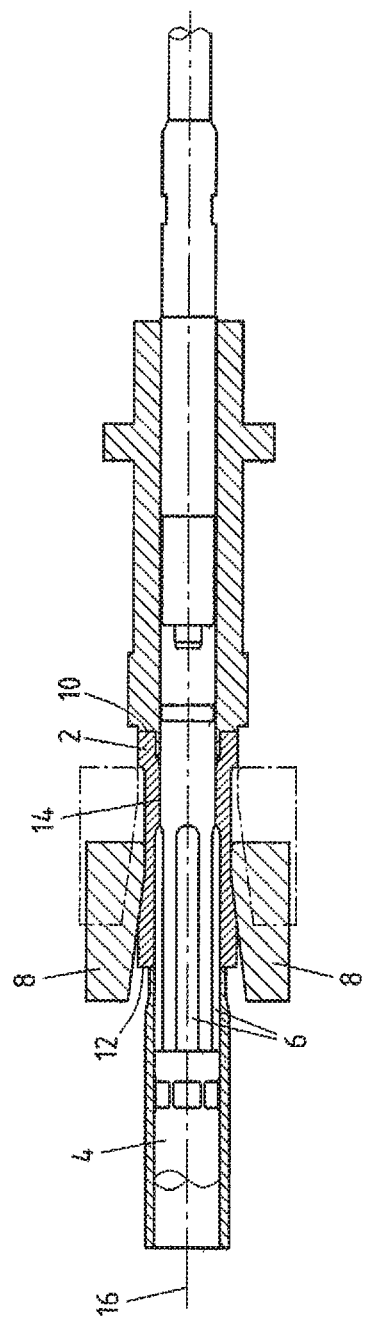
FIGS. 1-2 show a schematic illustration of a method for producing a metal sleeve from the prior art.
Figure 2:
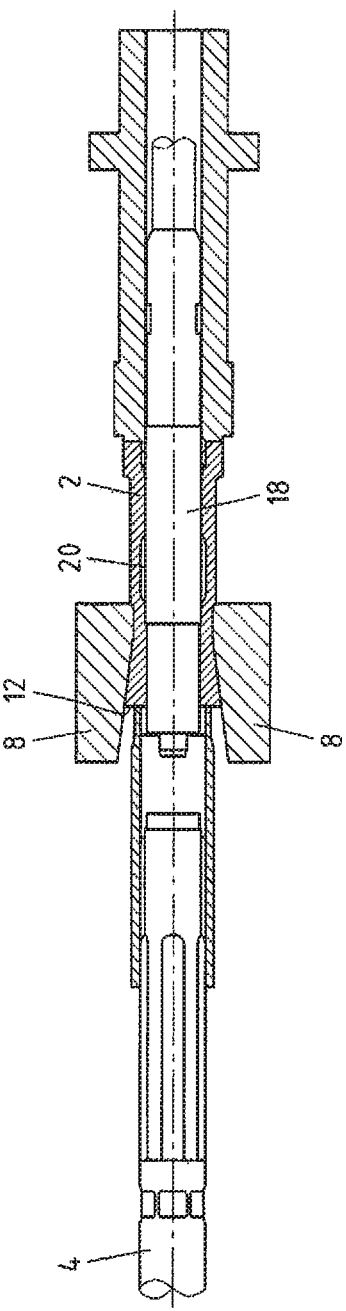

FIGS. 1-2 schematically show a method for producing a metal sleeve from the prior art. A metal sleeve produced using this method from the prior art is illustrated in cross section in FIG. 3.

In the first step of the method from the prior art (FIG. 1), firstly a sleeve-shaped semi-finished product 2 is pulled over a mandrel 4 which has radial bulges 6 on its peripheral side. Using four radially arranged forging hammers 8 (only two of which forging hammers are visible in the cross-sectional view in FIG. 1) the semi-finished product 2 is then in an area spaced apart from its distal opening 10 and from its proximal opening 12 pressed from the outside against the bulges 6 of the mandrel 4 by radial forging, so that in this area grooves corresponding to the bulges 6 are inserted into the inner channel 14 of the semi-finished product 2.

In the second step of the method from the prior art (FIG. 2), the mandrel 4 is withdrawn from the semi-finished product 2 and a further mandrel 18 without any bulges is moved into the semi-finished product 2. Using the four radially arranged forging hammers 8, the semi-finished product 2 is then in an area facing the proximal opening 12 pressed from the outside against the mandrel 18 by radial forging, so that the grooves 20 inserted into the inner channel 14 in the first step are delimited in the proximal direction.

Figure 3:
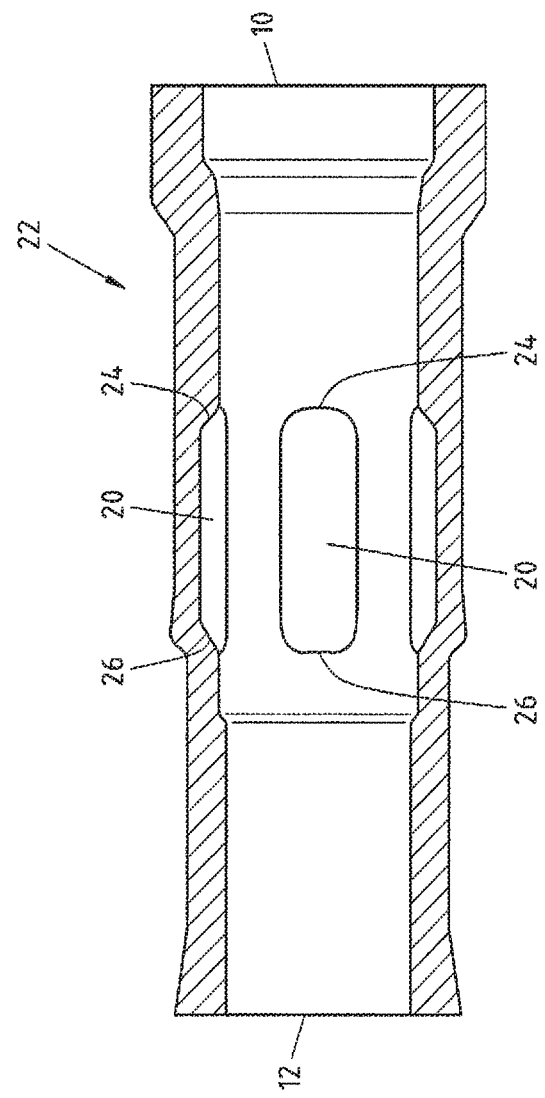
FIG. 3 shows a metal sleeve from the prior art which was produced by the method described in FIGS. 1-2, FIGS. 4-5 show a first method step for producing a second metal sleeve semi-finished product from a solid metal body according to an exemplary embodiment of the method for producing a metal sleeve.

A metal sleeve 22 produced in this way is illustrated in FIG. 3. The groove 20 has a distal front edge 24 facing the distal opening 10 and a proximal front edge 26 facing the proximal opening 12. A metal sleeve produced by radial forging like the metal sleeve 22, particularly in the area of the proximal front edge 26, has a fibre orientation which is characteristic for radial forging.

The disadvantage of the method from the prior art outlined with the aid of FIGS. 1-2 lies in the long production time of 40 to 45 seconds per metal sleeve 22, which is required for radially forging the grooves in the first step and for delimiting the grooves in the proximal direction in the second step.

An exemplary embodiment for the method according to the invention for producing a metal sleeve is now described below with the aid of FIGS. 4-8, wherein in each of these figures a method step of the method is illustrated. FIGS. 4 to 8 are in each case split into two, wherein the right side illustrates the situation at the beginning and the left side illustrates the situation at the end of the respective method step.

The method steps illustrated in FIGS. 4 to 6 and 8 are optional method steps according to preferred embodiments of the method according to the invention.

Figure 9:
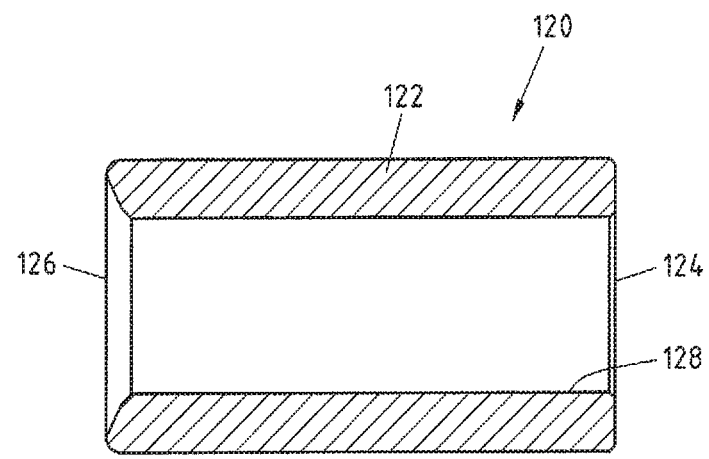
FIG. 9 shows a second metal sleeve semi-finished product as can be produced using the method step from FIGS. 4-5 and as can be used for the method step from FIG. 6.
Figure 10:
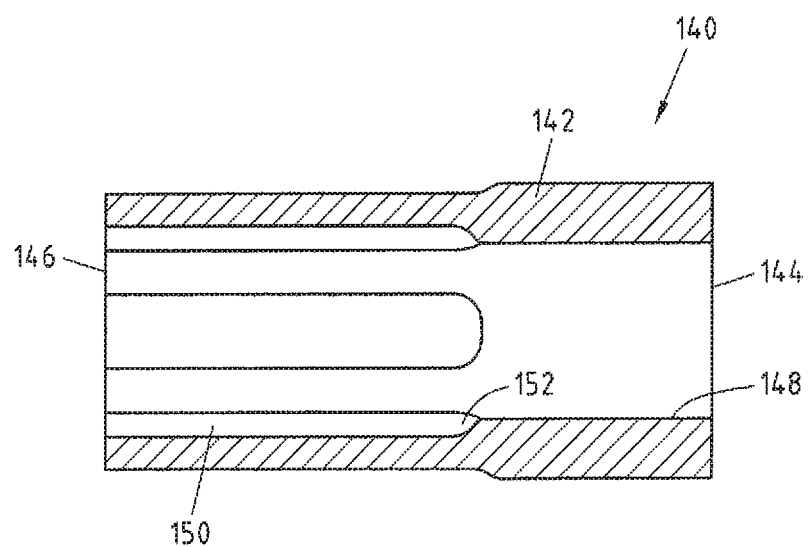
FIG. 10 shows a first metal sleeve semi-finished product as can be produced using the method step from FIG. 6 and as can be used for the method step in FIG. 7.
Figure 11:
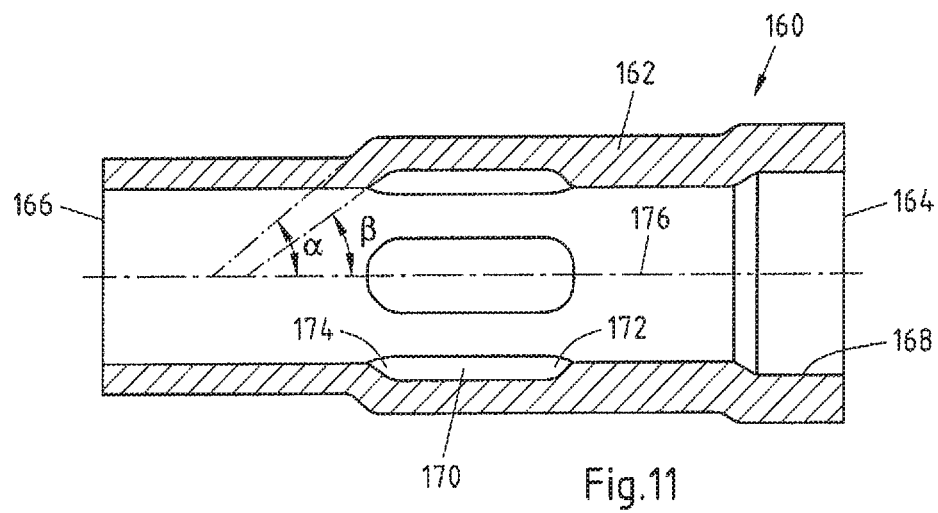
FIG. 11 shows a metal sleeve as can be produced using the method step from FIG. 7 and as can be used for the method step in FIG. 8.
Figure 12:
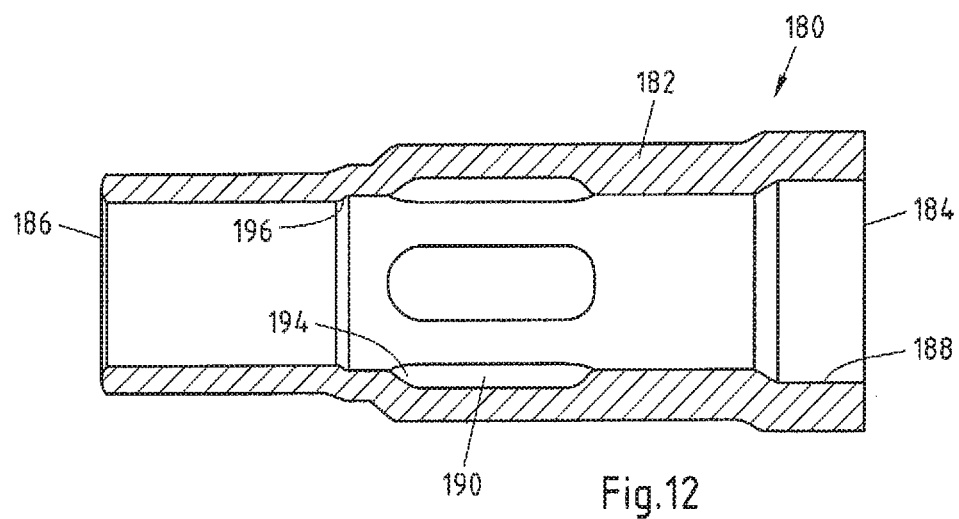
FIG. 12 shows a further processed metal sleeve as can be produced using the method step in FIG. 8.

In addition, the results of the forming operations on the metal body obtained using the individual method steps are illustrated in FIGS. 9 to 12. In particular, FIG. 9 shows a second metal sleeve semi-finished product 120 in cross section, FIG. 10 shows a first metal sleeve semi-finished product 140 in cross section, FIG. 11 shows a metal sleeve 160 in cross section and FIG. 12 shows a further processed metal sleeve 180 in cross section.

Figure 4:
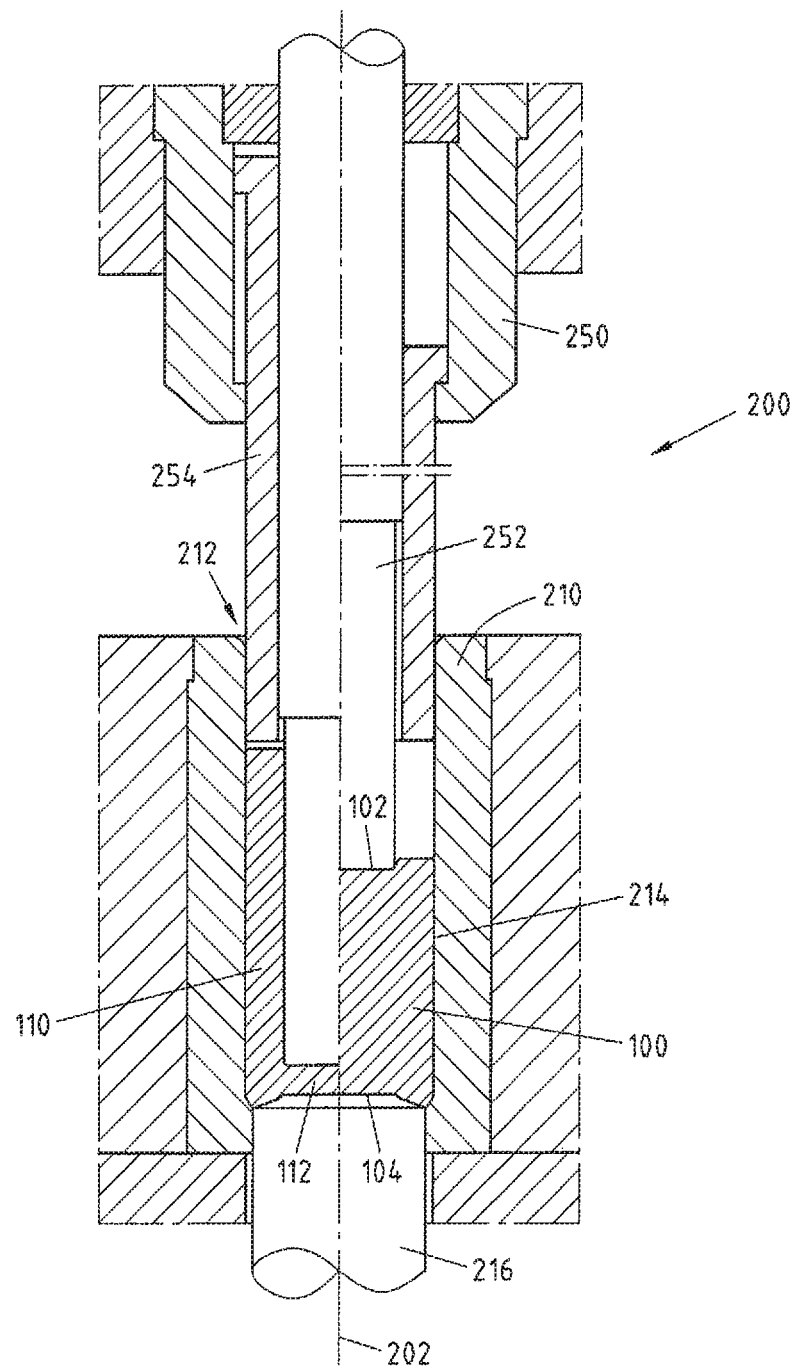

FIG. 4 shows a tool 200 for cup backward impact extrusion. The tool 200 has a die 210 for cup backward impact extrusion and an associated punch tool 250. The die 210 has an inner contour 214 extending from the die opening 212 in the axial direction 202, wherein the inner contour is cylindrically formed and is delimited at the bottom by a bottom punch 216. The punch tool 250 has a central punch 252 which can be moved in the axial direction with great force into the opening 212 of the die 210. In addition, the punch tool 250 has a sleeve 254 which is arranged around the punch 252 and is movable in the axial direction with respect to it.

At the beginning of the first method step, firstly a cylindrical solid metal body 100 is inserted into the die 210 (right side of FIG. 4). The solid metal body on both abutting faces has a central indentation 102 and 104 respectively, so that the punches 252 and 216 can be centred better on the metal body 100. When the first method step is carried out, the punch 252 is then pressed with great force into the solid metal body 100, so that the material of the solid metal body begins to flow and flows into the area surrounding the punch 252. In this way, a cup-shaped metal body 110 is produced (left side of FIG. 4).

Figure 5:
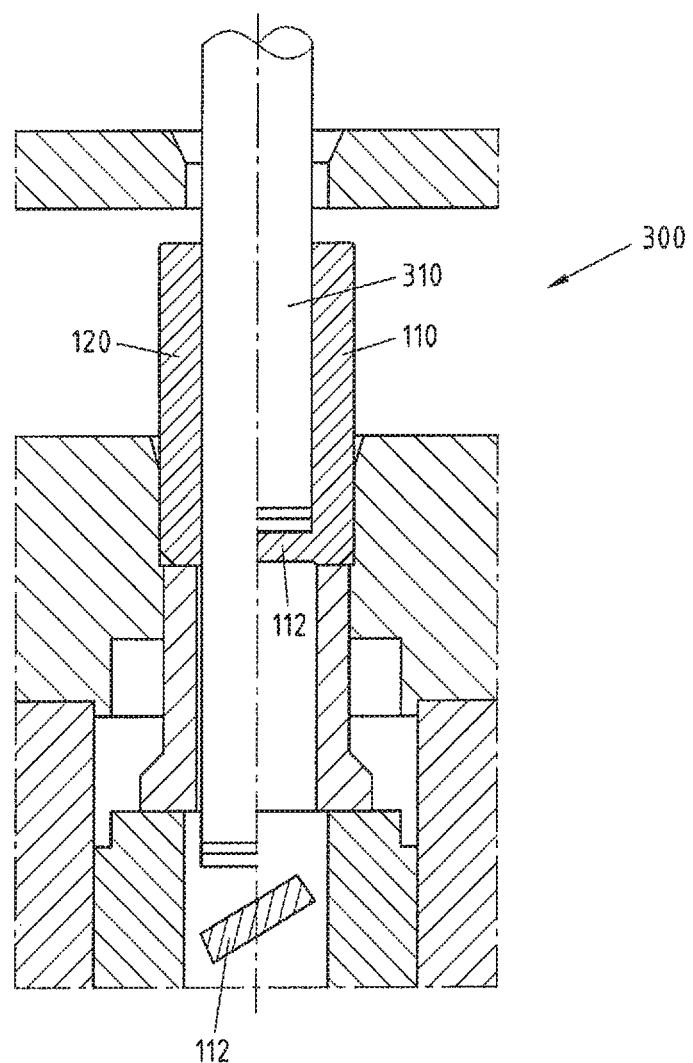

Subsequently, the cup-shaped metal body 110 is inserted into a punching tool 300 (FIG. 5, right side) by means of which the bottom 112 of the cup-shaped metal body 110 is punched out of the cup-shaped metal body 110 through the downward movement of a punch 310, so that a second metal sleeve semi-finished product 120 results. (FIG. 5, left side). The second metal sleeve semi-finished product 120 produced in this way is illustrated in FIG. 9. The second metal sleeve tool 120 has a metal body 122 which surrounds an inner channel 128 running between a distal opening 124 and a proximal opening 126.

Figure 6:
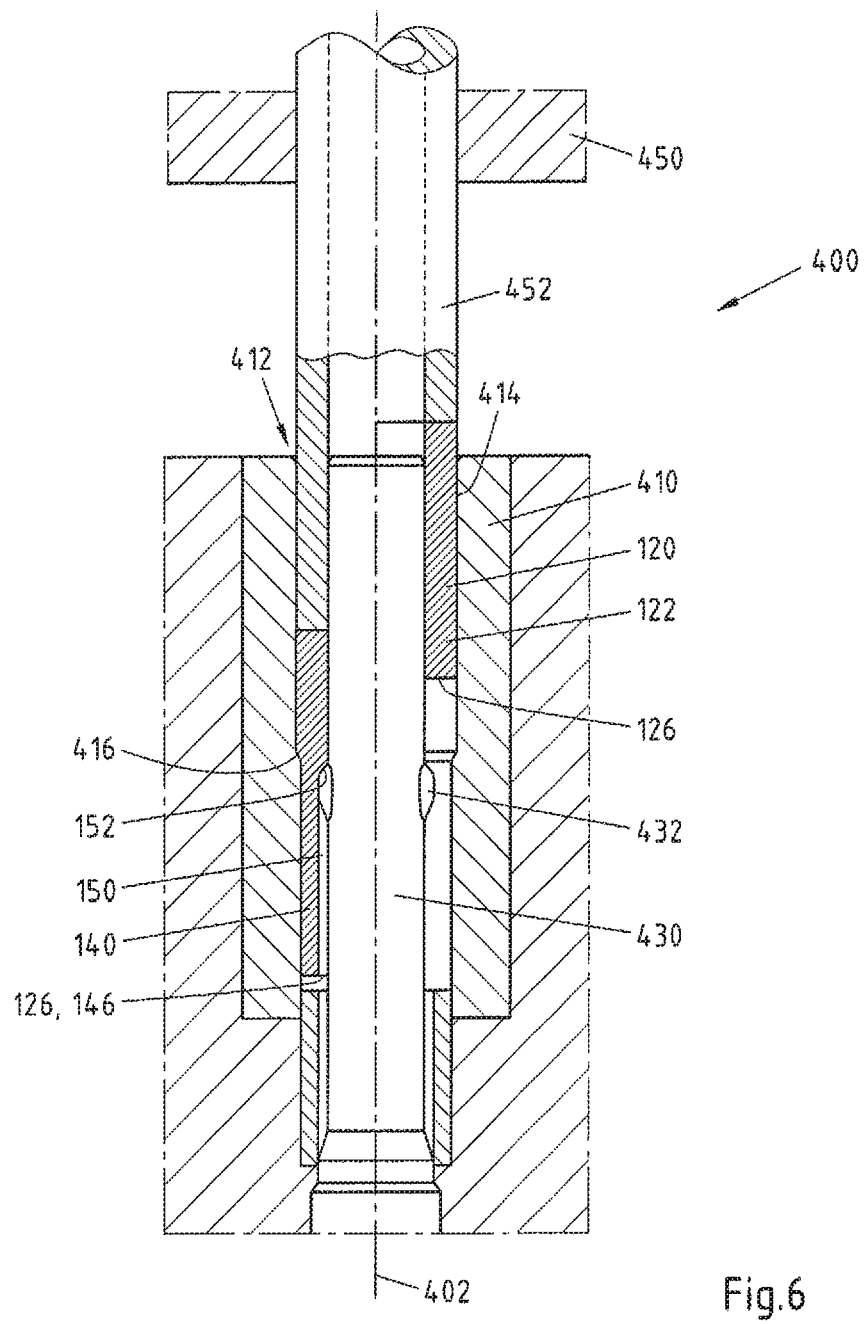
FIG. 6 shows a second method step for producing a first metal sleeve semi-finished product from the second metal sleeve semi-finished product according to the exemplary embodiment of the method according to the invention for producing a metal sleeve.

In the second method step illustrated in FIG. 6, the second metal sleeve semi-finished product 120 is processed into a first metal sleeve semi-finished product 140. A second impact extrusion tool 400 having a second die 410 and a second punch 450 is used for this purpose. The second die 410 has an inner contour 414 extending in the axial direction 402 from the die opening 412 for inserting the second metal sleeve semi-finished product 120 and having a cross-sectional tapering 416 spaced apart from the die opening 412. In addition, a mandrel 430, which on its outside has four bulges 432 distributed over the periphery, is arranged in the die.

At the beginning of the method step, the second metal sleeve semi-finished product 120 is inserted with the proximal opening 126 at the front into the die opening 412 (FIG. 6, right side) and then is pressed under high pressure into the second die 410 by means of a punch 452 of the punch tool 450. By means of the cross-sectional tapering 416 of the inner contour of the second die 410 and the bulges 432 of the mandrel 430 arranged in this area, four grooves 150, which are stepped on one side and distributed over the periphery, are inserted into the metal body 122 of the second metal sleeve semi-finished product 120, these grooves 150 running continuously from a distal front end 152 to the proximal opening 126, 146 (FIG. 6, left side).

The first metal sleeve semi-finished product 140 produced in this way is illustrated in FIG. 10. The metal body 142 of the first metal sleeve semi-finished product 140 has a distal opening 144 and a proximal opening 146, between which an inner channel 148 runs. The inner channel has four grooves 150 distributed in the peripheral direction which are each stepped on one side by a distal front edge 152 and run continuously to the proximal opening 146.

Figure 7:
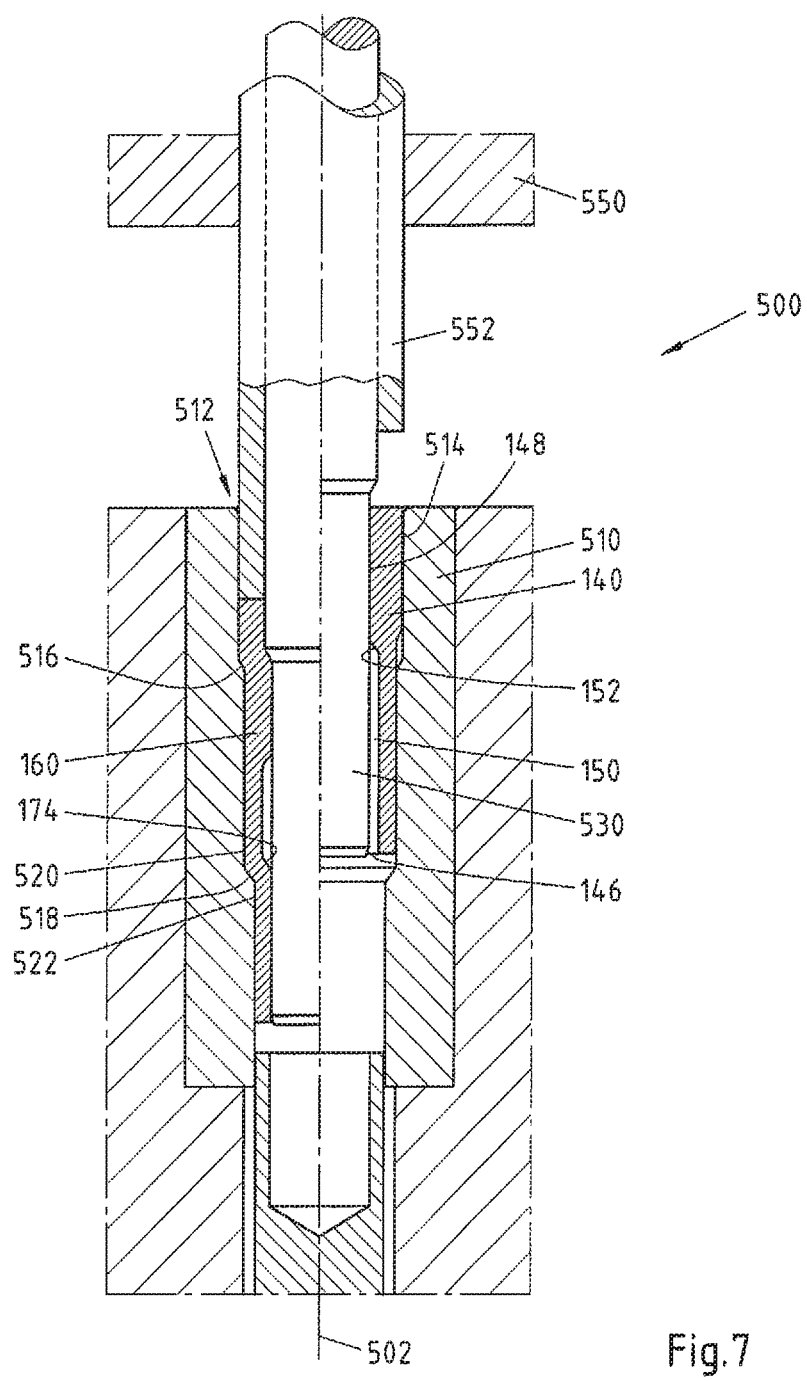
FIG. 7 shows a third method step for producing a metal sleeve from the first metal sleeve semi-finished product according to the exemplary embodiment of the method for producing a metal sleeve.

This first metal sleeve semi-finished product 140 is processed further into a metal sleeve 160 in the third method step illustrated in FIG. 7. A first impact extrusion tool 500 having a first die 510 and a first punch tool 550 which has a punch 552 is used for this purpose. The first die 510 has an inner contour 514 extending in the axial direction 502 from the die opening 512 for inserting the first metal sleeve semi-finished product 140 and having a first cross-sectional tapering 516 and a second cross-sectional tapering 518.

The inner contour 414 of the first die 510 above the second cross-sectional tapering 518 has a first area 520 with a first cross section which is constant in the axial direction and below the second cross sectional tapering 518 has a second area 522 with a second smaller cross section which is constant in the axial direction. The cross sectional tapering 518 itself forms a transition area between the first area 520 and the second area 522, in which the cross section decreases from the first larger to the second smaller cross section. The angle of the inner contour 414 to the axial axis or to the axial direction 402, respectively, is essentially constant in this transition area and preferably lies in the range between 25° and 55°, preferably between 30° and 50°, in particular between 35° and 45°. At the beginning of the method step, the first metal sleeve semi-finished product 140 is inserted with the proximal opening 146 at the front into the die opening 512 and a mandrel 530 is introduced on the part of the punch tool 550 into the inner channel 148 of the second metal sleeve semi-finished product (FIG. 7, right side). The mandrel 530 in sections has a cylindrical shape adapted to the inner channel 148 of the first metal sleeve semi-finished product 140.

The first metal sleeve semi-finished product 140 is then pressed with great force into the first die 510 by means of the punch 552, in fact, to the extent that the proximal opening 146 of the first metal sleeve semi-finished product 140 lies behind and the distal front edge 152 lies in front of the second cross-sectional tapering 518. The material of the metal body 142 is formed through the second cross-sectional tapering 518 by impact extrusion, wherein a proximal front edge 174 delimiting the groove 150 in the proximal direction is formed (FIG. 7, left side).

The degree of deformation by which the metal body 142 is formed at the second cross-sectional tapering 518, is preferably in the range between 30 and 45%, preferably between 35 and 40%. The degree of deformation results from the ratio of the cross-sectional areas which are available for the metal body 142 in the first die 510 directly in front of and behind the cross-sectional tapering 158. For example, if the cross section of the first die 510, which owing to the mandrel 530 is essentially annular, in front of the cross-sectional tapering 518, i.e. in the first area 520, has an area $Q_1$ and behind the cross-sectional tapering 518, i.e. in the second area 522, has an area $Q_2=0.65 \cdot Q_1$, then the degree of deformation $U=1-Q_2/Q_1=35\%$.

The force with which the first metal sleeve semi-finished product 140 is pressed into the first die 510 in particular is dependent on the material of the metal sleeve, on its cross section and on the cross-sectional tapering (in particular on the degree of deformation). For certain metal sleeves these forces can, for example, lie in a range of 200 to 250 t.

The metal sleeve 160 produced in this method step is precisely illustrated in FIG. 11. The metal sleeve 160 has a metal body 162 which surrounds an inner channel 168 running between a distal opening 164 and a proximal opening 166. Four grooves 170 are inserted into the inner channel 168 uniformly distributed over the periphery of the same, each of these grooves 170 being delimited and stepped on both sides by a distal front edge 172 facing the distal opening 164 and a proximal front edge 174 facing the proximal opening 166.

The outer contour of the metal sleeve 160 in the area of the proximal front edge 174 has a contour corresponding to the cross-sectional tapering 518 for producing the proximal front edge 174, this contour having a maximum angle $\alpha$ to the axial axis 176 of the inner channel 168. The maximum angle of the proximal front edge 172 to the axial axis 176 of the inner channel 168 is indicated by $\beta$ in FIG. 11. The maximum angle of the cross-sectional tapering 518 to the axial axis 502 of the die 510 and to the axial axis 178 of the inner channel 168, respectively, and hence the angle $\alpha$ is preferably chosen such that the ratio $\alpha/\beta$ is greater than 1, preferably greater than 1.1.

Figure 8:
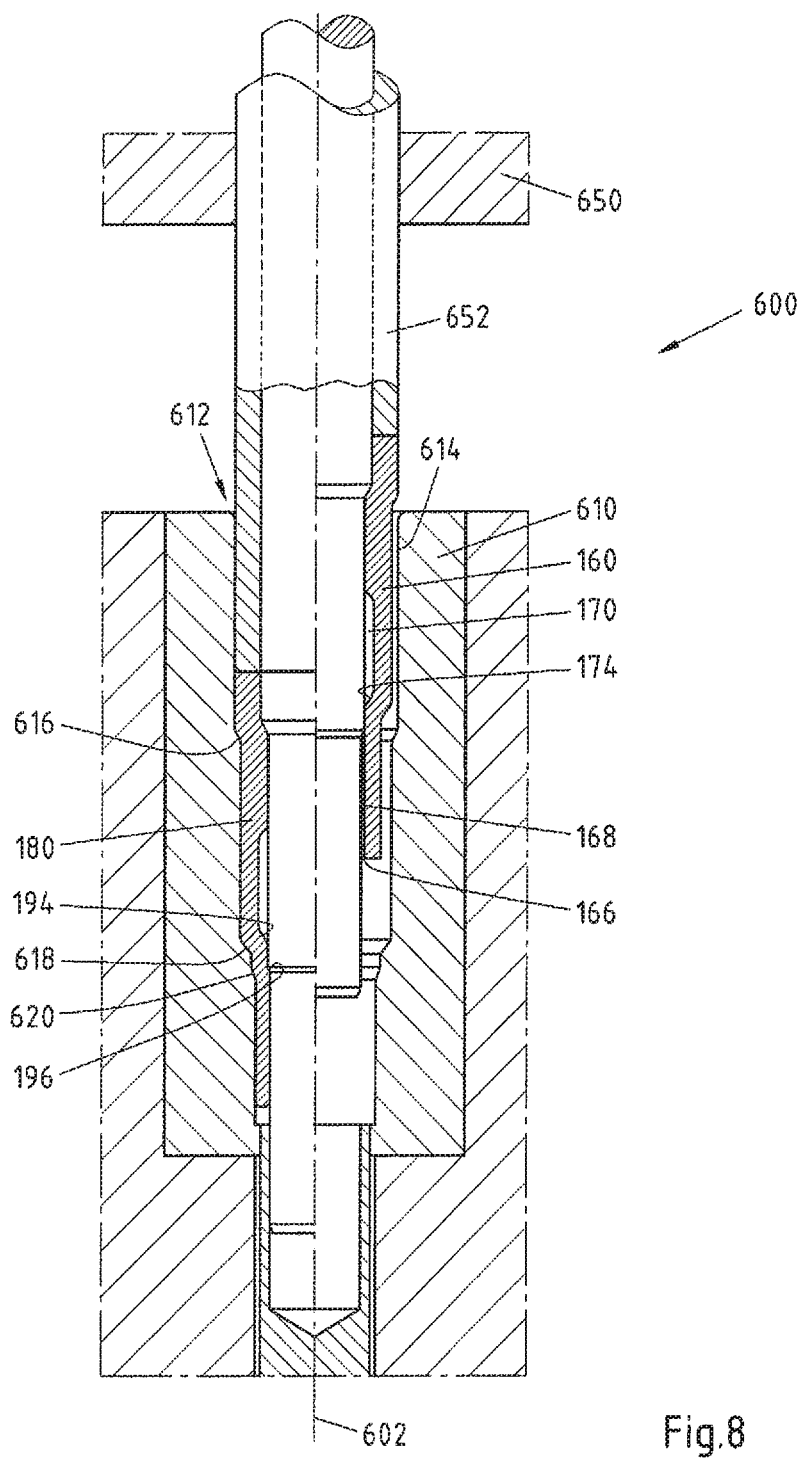
FIG. 8 shows a fourth method step for the further processing of the produced metal sleeve according to the exemplary embodiment of the method for producing a metal sleeve.

FIG. 8 shows a fourth method step for processing the metal sleeve 160 further into the further processed metal sleeve 180 illustrated in FIG. 12. An impact extrusion tool 600 having a third die 610 and a third punch tool 650 which has a punch 652 is used for this purpose. The third die has an inner channel 614 extending from the die opening 612 in the axial direction 602 and having a first cross-sectional tapering 616, a second cross-sectional tapering 618 and a third cross-sectional tapering 620.

At the beginning of the process, the metal sleeve 160 is inserted with the proximal opening 166 at the front into the die opening 612 (FIG. 8, right side) and then pressed with great force into the third die 610 by means of the punch 652. The metal sleeve 160 is pressed into the third die 610 to the extent that the proximal opening 166 of the metal sleeve 160 lies behind and the proximal front edge 174 lies in front of the third cross-sectional tapering 620. In this way, with the third cross-sectional tapering 620 an additional step can be formed into the area of the metal body 162 arranged between the proximal front edge 174 and the proximal opening 166 and hence the cross section of the inner channel 168 can be set to a certain size in this area without adversely affecting the previously completed groove 170 (FIG. 8, left side).

The further processed metal sleeve 180 produced using the method step described in FIG. 8, is illustrated in FIG. 12. The further processed metal sleeve 180 essentially differs from the metal sleeve 160 by the fact that the inner channel 188 running between the distal opening 184 and the proximal opening 186 has a further cross-sectional tapering 196 arranged between the proximal front edge 194 of the groove 190 and the proximal opening 186, so that the inner and outer cross section of the metal body 182 in the area of the proximal opening 186 is adapted independently of the cross section in the area of the groove 190.

Figure 13:
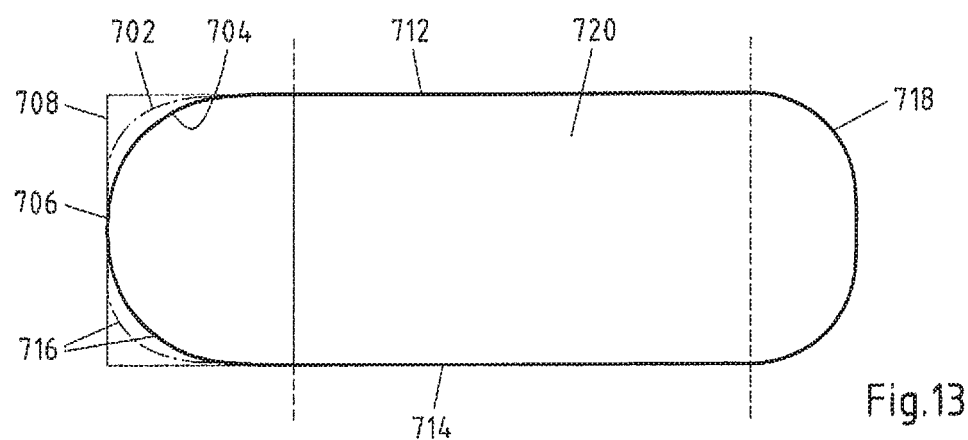
FIG. 13 shows an illustration of the groove contour in the area of the proximal front edge.

FIG. 13 shows the groove contour of the groove, in fact, on the one hand, with a proximal front edge (groove contour 702) produced according to the prior art by radial forging and with a proximal front edge (groove contour 704) produced by impact extrusion corresponding to the method described with the aid of FIGS. 5 to 8. The groove contours are in each case illustrated as an equal-area projection into a plane.

Both groove contours 702 and 704 have two axial areas 712, 714 respectively, in which the groove contour runs essentially parallel to the axial axis of the respective metal sleeve, and a proximal front edge area 716 and a distal front edge area 718, by means of which the groove areas 720 enclosed by the groove contours in each case are delimited in the proximal and distal direction respectively.

As can be seen from FIG. 13, in the proximal front edge area 716 the groove contour 704 produced by impact extrusion has a substantially rounder almost semi-circular shape, whilst the groove contour 702 produced by radial forging rather has the shape of a rectangle rounded at the corners. In particular, a straight groove contour section running essentially transverse to the axial direction is produced in the proximal area of the proximal front edge during the radial forging process.

The smallest rectangle 708 embedding the groove area in the proximal front edge area is also illustrated in FIG. 13. As can be seen from FIG. 13, the groove area of the impact-extruded metal sleeve delimited by the groove contour 704 is much smaller than the groove area of the groove area of the radially forged metal sleeve delimited by the groove contour 702. In particular, the groove area of the impact-extruded metal sleeve in the proximal front edge area is less than 85%, in particular less than 80%, of the area of the rectangle 708.

The impact-extruded metal sleeve can be distinguished from a radially forged metal sleeve in this way.

In addition, a metal sleeve in which the proximal front edge has been produced by impact extrusion can also be distinguished from a metal sleeve in which the proximal front edge has been produced by radial forging by the fibre orientation which is characteristic for impact extrusion. Typical examples of the fibre orientations in the area of the proximal front edge which are characteristic for radial forging and for impact extrusion respectively are illustrated below by means of FIGS. 14 and 15.

Figure 14:
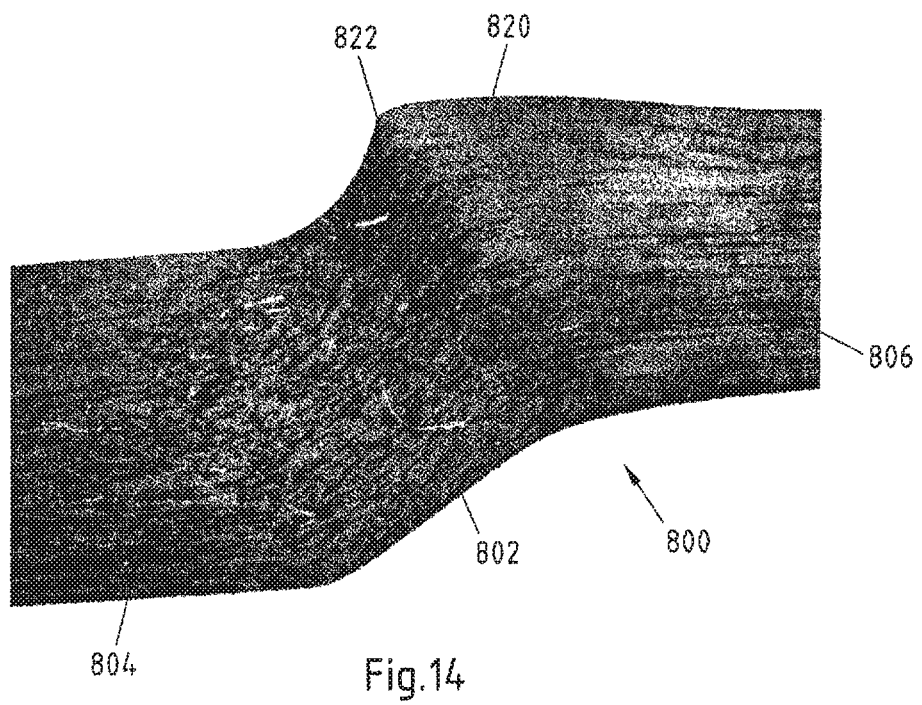
FIG. 14 shows an image of the fibre structure of a metal sleeve in the area of the proximal front edge, in which the proximal front edge of the metal sleeve was produced by radial forging.
Figure 15:
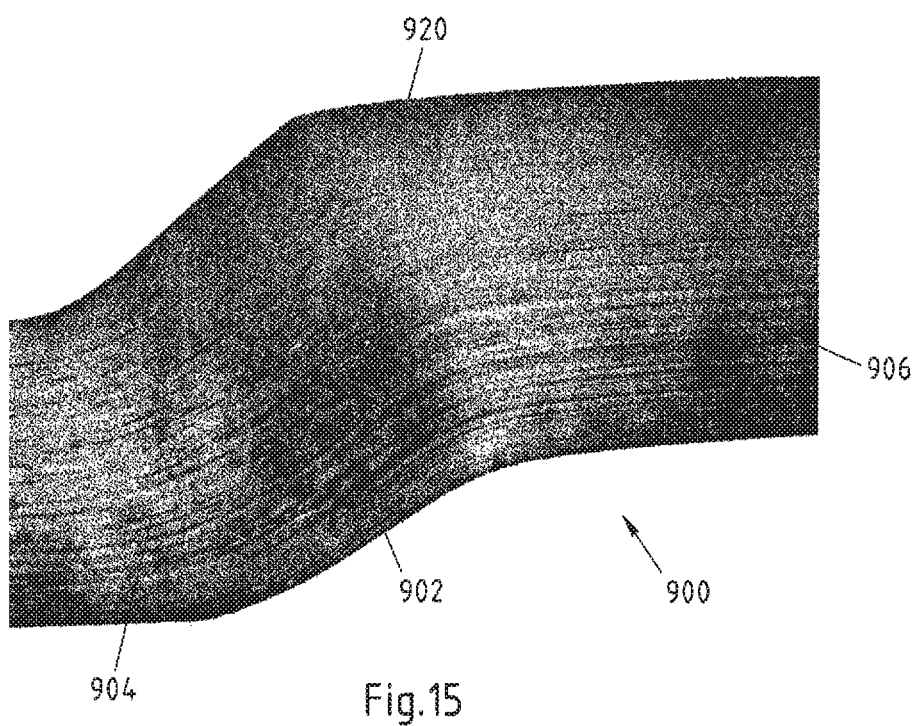
FIG. 15 shows an image of the fibre structure of a metal sleeve in the area of the proximal front edge, in which the proximal front edge of the metal sleeve was produced by impact extrusion.

FIG. 14 shows an image of the fibre structure of a first metal sleeve 800 in the area of the proximal front edge, wherein the proximal front edge 802 of the first metal sleeve 800 has been produced by radial forging, and FIG. 15 shows an image of the fibre structure of a second metal sleeve 900 in the area of the proximal front edge 902, wherein the proximal front edge 902 of the second metal sleeve 900 has been produced by impact extrusion. For these images, the first and second metal sleeves 800, 900 were respectively cut open in the longitudinal direction and the respective cut face polished and then etched, so that the fibre structures of the metal sleeves 800, 900 became visible.

As can be seen from FIG. 14, the first metal sleeve 800 has a fibre orientation in the area of the proximal front edge 802 which on the whole is heavily deformed by compression and distorted, with a large number of interruptions and displacements of the individual fibres. In particular, the fibre orientation in the area of the proximal front edge 802 differs greatly from the clearly smoother fibre orientation in the areas 804, 806 abutting on this area of the proximal front edge 802. This fibre orientation, which is deformed by compression and distorted and is typical for radial forging, in the area of the proximal front edge 802 is brought about by the forming forces transferred to the metal sleeve 800 in the radial direction by the forging hammers.

The fibre orientation of the metal sleeve 900 illustrated in FIG. 15 is, in contrast, very smooth and does not have any appreciable deformations by compression, distortions or interruptions in the area of the proximal front edge 902, but essentially follows the contour of the metal body. The fibre orientation of the metal sleeve 900 in the area of the proximal front edge 902 is comparable with the fibre orientation in the areas 904, 908 abutting on this area of the proximal front edge 902. Such a fibre orientation typical for impact extrusion is achieved by causing the metal material of the metal sleeve 900 to flow during the impact extrusion process.

In addition to examples of characteristic fibre orientations, FIGS. 14 and 15 also show examples of characteristic outer contours 820, 920 of the metal sleeves 800, 900, which have been produced by radial forging and impact extrusion respectively. In the case of the radially forged metal sleeve 800, the forging hammers acting on the metal sleeve from the outside produce a relatively sharp bend 822, on which the outer contour has a very large angle to the axial axis of the inner channel. In FIG. 14, this angle is almost at 90°. In the case of the metal sleeve 902, the outer contour in the area of the proximal front edge 902 is directly determined by the contour at the cross-sectional tapering of the first die (518 in FIG. 7), so that a smoother course of the outer contour 920 is made possible with a maximum angle to the axial axis of the inner channel of at most 75°, at most 60° or even at most 45° respectively.

The invention claimed is:

1. A method for producing a pressed metal sleeve comprising:
    providing a semi-finished product comprising a metal body, wherein the metal body of the semi-finished product surrounds an inner channel of the semi-finished product running between a proximal opening of the metal body of the semi-finished product and a distal opening of the metal body of the semi-finished product, and wherein at least one groove, which is stepped on one side, is located in the metal body of the semi-finished product on a side of the inner channel of the semi-finished product, this groove of the semi-finished product running continuously from a distal front edge of the metal body of the semi-finished product to the proximal opening of the metal body of the semi-finished product, and
    pressing the semi-finished product into a first die by means of a first punch thereby forming the semi-finished product by impact extrusion into a pressed metal sleeve, wherein the semi-finished product is inserted into the first die with the proximal opening of the metal body of the semi-finished product at a front of a die opening of the first die, wherein the first die is designed such that a proximal front edge of the pressed metal sleeve, which is spaced apart from the distal front edge of the metal body of the semi-finished product and delimits a pressed metal sleeve groove being formed in the proximal direction, is formed in the metal body of the semi-finished product on the side of the inner channel of the semi-finished product, and
    wherein the first die has an inner contour, which extends in the axial direction from the die opening for inserting the semi-finished product and has a cross-sectional tapering which is spaced apart from the die opening, and the semi-finished product is pressed into the first die by means of the first punch to the extent that the proximal opening of the metal body of the semi-finished product lies behind and the distal front edge of the metal body of the semi-finished product lies in front of the cross-sectional tapering, wherein the pressed metal sleeve comprises a pressed metal sleeve body which surrounds a pressed metal sleeve inner channel running between a proximal opening of the pressed metal sleeve and a distal opening of the pressed metal sleeve, wherein the pressed metal sleeve inner channel comprises the pressed metal sleeve groove set back into the pressed metal sleeve body, running in a longitudinal direction of the pressed metal sleeve inner channel and stepped on both sides by a distal front edge of the pressed metal sleeve and the proximal front edge of the pressed metal sleeve, a proximal front edge of the pressed metal sleeve groove is produced by the impact extrusion during pressing, and a width of a groove area of the pressed metal sleeve groove decreases steadily in a proximal direction in an area of the proximal front edge of the pressed metal sleeve to a width of less than 25% of a maximum width of the groove area.

2. The method according to claim 1, wherein the inner contour of the first die in an area of cross-sectional tapering has a first area with a first cross section which is constant in an axial direction, a transition area adjoining the first area on a side facing away from the die opening and with a cross section decreasing in the axial direction from the first cross section to a second smaller cross section and a second area adjoining the transition area on the side facing away from the die opening and with a second cross section which is constant in the axial direction, wherein an inner contour in the transition area has a maximum angle of 25° to 55° to an axial axis of the inner channel of the semi-finished product.

3. The method according to claim 1, wherein a degree of deformation on the cross-sectional tapering is in a range between 30 and 45%.

4. The method according to claim 1, wherein the semi-finished product is provided
    by providing a preliminary semi-finished product with a preliminary semi-finished metal body, wherein the preliminary semi-finished metal body surrounds a preliminary semi-finished inner channel running between a proximal opening of the preliminary semi-finished product and a distal opening of the preliminary semi-finished product, and
    by pressing the preliminary semi-finished product into a second die by means of a second punch thereby forming the preliminary semi-finished product by impact extrusion into the semi-finished product, wherein a mandrel is arranged and designed in the second die in such a way that a preliminary semi-finished groove, which is stepped on one side, is formed in the preliminary semi-finished metal body on a side of the preliminary semi-finished inner channel and runs continuously from a distal front edge of the preliminary semi-finished product to the proximal opening of the preliminary semi-finished product.

5. The method according to claim 4, wherein the mandrel in the second die has at least one lateral bulge running in a longitudinal direction of the mandrel for forming the at least one preliminary semi-finished groove which is stepped on one side.

6. The method according to claim 1, further comprising pressing the pressed metal sleeve into a further die by means of a further punch thereby further forming the pressed metal sleeve by impact extrusion, wherein the further die has an inner contour, which extends from a die opening of the further die for inserting the pressed metal sleeve and has a cross-sectional tapering which is spaced apart from the die opening of the further die, and the pressed metal sleeve is pressed into the further die by means of the further punch to the extent that the proximal opening of the pressed metal sleeve lies behind and the proximal front edge of the pressed metal sleeve lies in front of the cross-sectional tapering.

7. The method according to claim 3, wherein the degree of deformation on the cross-sectional tapering is in the range between 35 and 40%.

8. The method according to claim 4, further comprising pressing the pressed metal sleeve into a third die by means of a third punch thereby further forming the pressed metal sleeve by impact extrusion, wherein the third die has an inner contour, which extends from a die opening of the third die for inserting the pressed metal sleeve and has a cross-sectional tapering which is spaced apart from the die opening of the third die, and the pressed metal sleeve is pressed into the third die by means of the third punch to the extent that the proximal opening of the pressed metal sleeve lies behind and the proximal front edge of the pressed metal sleeve lies in front of the cross-sectional tapering.

9. The method according to claim 2, wherein the degree of deformation on the cross-sectional tapering is in the range between 30 and 45%.

10. A method for producing a pressed metal sleeve comprising:
    providing a semi-finished product comprising a metal body, wherein the metal body of the semi-finished product surrounds an inner channel of the semi-finished product running between a proximal opening of the metal body of the semi-finished product and a distal opening of the metal body of the semi-finished product, and wherein at least one groove, which is stepped on one side, is located in the metal body of the semi-finished product on a side of the inner channel of the semi-finished product, this groove of the semi-finished product running continuously from a distal front edge of the metal body of the semi-finished product to the proximal opening of the metal body of the semi-finished product, and
    pressing the semi-finished product into a first die by means of a first punch thereby forming the semi-finished product by impact extrusion into a pressed metal sleeve, wherein the semi-finished product is inserted into the first die with the proximal opening of the metal body of the semi-finished product at a front of a die opening of the first die, wherein the first die is designed such that a proximal front edge of the pressed metal sleeve, which is spaced apart from the distal front edge of the metal body of the semi-finished product and delimits a pressed metal sleeve groove being formed in a proximal direction, is formed in the metal body of the semi-finished product on the side of the inner channel of the semi-finished product, and
    wherein the first die has an inner contour, which extends in an axial direction from the die opening for inserting the semi-finished product and has a cross-sectional tapering which is spaced apart from the die opening, and the semi-finished product is pressed into the first die by means of the first punch to the extent that the proximal opening of the metal body of the semi-finished product lies behind and the distal front edge of the metal body of the semi-finished product lies in front of the cross-sectional tapering,
    wherein the pressed metal sleeve comprises a pressed metal sleeve body which surrounds a pressed metal sleeve inner channel running between a proximal opening of the pressed metal sleeve and a distal opening of the pressed metal sleeve, wherein the pressed metal sleeve inner channel comprises the pressed metal sleeve groove set back into the pressed metal sleeve body, running in a longitudinal direction of the pressed metal sleeve inner channel and stepped on both sides by a distal front edge of the pressed metal sleeve and the proximal front edge of the pressed metal sleeve, a proximal front edge of the pressed metal sleeve groove is produced by the impact extrusion during pressing.

11. The method according to claim 10, wherein the inner contour of the first die in an area of the cross-sectional tapering has a first area with a first cross section which is constant in an axial direction, a transition area adjoining the first area on a side facing away from the die opening and with a cross section decreasing in the axial direction from the first cross section to a second smaller cross section and a second area adjoining the transition area on the side facing away from the die opening and with a second cross section which is constant in the axial direction, wherein an inner contour in the transition area has a maximum angle of 25° to 55° to an axial axis of the inner channel of the semi-finished product.

12. The method according to claim 10, wherein a degree of deformation on the cross-sectional tapering is in a range between 30 and 45%.

13. The method according to claim 10, wherein the semi-finished product is provided
by providing a preliminary semi-finished product with a preliminary semi-finished metal body, wherein the preliminary semi-finished metal body product surrounds a preliminary semi-finished inner channel running between a proximal opening of the preliminary semi-finished product and a distal opening of the preliminary semi-finished product, and
by pressing the preliminary semi-finished product into a second die by means of a second punch thereby forming the preliminary semi-finished product by impact extrusion into the semi-finished product, wherein a mandrel is arranged and designed in the second die in such a way that a preliminary semi-finished groove, which is stepped on one side, is formed in the preliminary semi-finished metal body on a side of the preliminary semi-finished inner channel and runs continuously from a distal front edge of the preliminary semi-finished product to the proximal opening of the preliminary semi-finished product.

14. The method according to claim 13, wherein the mandrel in the second die has at least one lateral bulge running in a longitudinal direction of the mandrel for forming the preliminary semi-finished groove which is stepped on one side.

15. The method according to claim 10, further comprising pressing the pressed metal sleeve into a further die by means of a further punch thereby further forming the pressed metal sleeve by impact extrusion, wherein the further die has an inner contour, which extends from a die opening of the further die for inserting the pressed metal sleeve and has a cross-sectional tapering which is spaced apart from the die opening of the further die, and the pressed metal sleeve is pressed into the further die by means of the further punch to the extent that the proximal opening of the pressed metal sleeve lies behind and the proximal front edge of the pressed metal sleeve lies in front of the cross-sectional tapering.

16. The method according to claim 12, wherein the degree of deformation on the cross-sectional tapering is in the range between 35 and 40%.

17. The method according to claim 13, further comprising pressing the pressed metal sleeve into a third die by means of a third punch thereby further forming the pressed metal sleeve by impact extrusion, wherein the third die has an inner contour, which extends from a die opening of the third die for inserting the pressed metal sleeve and has a cross-sectional tapering which is spaced apart from the die opening of the third die, and the pressed metal sleeve is pressed into the third die by means of the third punch to the extent that the proximal opening of the pressed metal sleeve lies behind and the proximal front edge of the pressed metal sleeve lies in front of the cross-sectional tapering.

18. The method according to claim 11, wherein the degree of deformation on the cross-sectional tapering is in the range between 30 and 45%.

* * * * *

UNITED STATES PATENT AND TRADEMARK OFFICE
CERTIFICATE OF CORRECTION

PATENT NO. : 10,670,133 B2
APPLICATION NO. : 15/034261
DATED : June 2, 2020
INVENTOR(S) : Christoph Guhe Page 1 of 1

It is certified that error appears in the above-identified patent and that said Letters Patent is hereby corrected as shown below:

In the Claims

Column 17, Lines 57-58, Claim 5, before "preliminary" delete "at least one"

Signed and Sealed this
Twenty-ninth Day of September, 2020

Andrei Iancu
*Director of the United States Patent and Trademark Office*